(12) United States Patent
Marshall

(10) Patent No.: US 8,627,705 B2
(45) Date of Patent: Jan. 14, 2014

(54) SELF COMPENSATING SLIDING AIR VALVE MECHANISM

(75) Inventor: Harold James Marshall, Forest, VA (US)

(73) Assignee: Belvac Production Machinery, Inc., Lynchburg, VA (US)

(*) Notice: Subject to any disclaimer, the term of this patent is extended or adjusted under 35 U.S.C. 154(b) by 1130 days.

(21) Appl. No.: 12/501,153

(22) Filed: Jul. 10, 2009

(65) Prior Publication Data

US 2010/0212130 A1  Aug. 26, 2010

Related U.S. Application Data

(60) Provisional application No. 61/202,427, filed on Feb. 26, 2009.

(51) Int. Cl.
*B65G 17/46* (2006.01)

(52) U.S. Cl.
USPC ............. 72/405.03; 198/803.5; 29/35.5

(58) Field of Classification Search
USPC .......... 72/38, 405.03, 94; 198/803.5, 867.03, 198/955, 468.4, 471.1; 29/33 R–38 F; 406/77–82
See application file for complete search history.

(56) References Cited

U.S. PATENT DOCUMENTS

| | | | |
|---|---|---|---|
| 1,673,236 A | 6/1928 | Fleisher | |
| 3,378,285 A | 4/1968 | Staley | |
| 3,418,837 A | 12/1968 | Vanderlaan et al. | |
| 3,581,542 A | 6/1971 | Wahler et al. | |
| 3,682,296 A * | 8/1972 | Buhayar et al. | 198/803.12 |
| 3,797,429 A | 3/1974 | Wolfe | |
| 3,983,729 A | 10/1976 | Traczyk et al. | |
| 4,278,711 A | 7/1981 | Sullivan | |
| 4,402,202 A | 9/1983 | Gombas | |
| 4,446,714 A | 5/1984 | Cvacho | |
| 4,513,595 A | 4/1985 | Cvacho | |
| 4,519,232 A | 5/1985 | Traczyk et al. | |

(Continued)

FOREIGN PATENT DOCUMENTS

| | | |
|---|---|---|
| DE | 37 05 878 A1 | 9/1987 |
| DE | 39 08 394 C1 | 12/1989 |

(Continued)

OTHER PUBLICATIONS

U.S. Appl. No. 11/581,787, filed Oct. 17, 2006, Marshall.

(Continued)

*Primary Examiner* — Dana Ross
*Assistant Examiner* — Pradeep C Battula
(74) *Attorney, Agent, or Firm* — Nixon Peabody LLP

(57) ABSTRACT

A turret for an article processing machine assembly includes a turret main body, a sliding ram assembly, and an air manifold device. The air manifold device is connectable to the turret main body and provides pressurized air through a pressurized air pathway system. The pressurized air pathway system includes a turret air passage extending from the air manifold through the turret body to the sliding ram assembly, and a ram air passage that supplies the pressurized air to an article in the machine assembly. A valve mechanism is positioned between one end of the turret body air passage and a first end of the ram air passage. The valve mechanism includes a slidable disc that seals the connection between the turret body air passage and the ram air passage.

7 Claims, 12 Drawing Sheets

(56) References Cited

U.S. PATENT DOCUMENTS

| | | | |
|---|---|---|---|
| 4,547,645 A | 10/1985 | Smith | |
| 4,671,093 A | 6/1987 | Dominico et al. | |
| 4,697,414 A | 10/1987 | McCarty | |
| 4,773,525 A * | 9/1988 | Gertitschke et al. | 198/471.1 |
| 4,774,839 A | 10/1988 | Caleffi et al. | |
| 4,808,053 A | 2/1989 | Nagai et al. | |
| 4,824,303 A | 4/1989 | Dinger | |
| H906 H | 4/1991 | Baggett et al. | |
| 5,209,101 A | 5/1993 | Finzer | |
| 5,220,993 A | 6/1993 | Scarpa et al. | |
| 5,242,497 A | 9/1993 | Miller et al. | |
| 5,249,449 A | 10/1993 | Lee et al. | |
| 5,282,375 A | 2/1994 | Lee et al. | |
| 5,344,252 A | 9/1994 | Kakimoto | |
| 5,497,900 A | 3/1996 | Caleffi et al. | |
| 5,590,558 A | 1/1997 | Saunders et al. | |
| 5,590,790 A | 1/1997 | Saunders et al. | |
| 5,611,231 A | 3/1997 | Marritt et al. | |
| 5,676,006 A | 10/1997 | Marshall | |
| 5,718,030 A | 2/1998 | Langmack | |
| 5,755,130 A | 5/1998 | Tung et al. | |
| 5,771,807 A | 6/1998 | Moss | |
| 5,832,769 A | 11/1998 | Schultz | |
| 6,220,138 B1 | 4/2001 | Sakamoto | |
| 6,622,379 B1 | 9/2003 | Kano | |
| 6,637,247 B2 | 10/2003 | Bowlin | |
| 6,874,971 B2 | 4/2005 | Albaugh | |
| 7,219,790 B2 | 5/2007 | Lanfranchi | |
| 7,263,867 B2 | 9/2007 | Bartosch et al. | |
| 7,310,983 B2 | 12/2007 | Schill et al. | |
| 7,387,007 B2 | 6/2008 | Schill et al. | |
| 7,404,309 B2 | 7/2008 | Schill et al. | |
| 7,409,845 B2 | 8/2008 | Schill et al. | |
| 7,418,852 B2 | 9/2008 | Schill et al. | |
| 7,454,944 B2 | 11/2008 | Schill et al. | |
| 7,464,573 B2 | 12/2008 | Shortridge | |
| 7,530,445 B2 | 5/2009 | Marshall et al. | |
| 7,568,573 B2 | 8/2009 | Schill | |
| 7,805,970 B2 | 10/2010 | Woulds | |
| 8,286,456 B2 * | 10/2012 | Coates | 72/94 |
| 2002/0125105 A1 * | 9/2002 | Nakakado | 198/471.1 |
| 2003/0063949 A1 | 4/2003 | Hohenocker | |
| 2006/0101885 A1 | 5/2006 | Schill et al. | |
| 2006/0101889 A1 | 5/2006 | Schill et al. | |
| 2007/0227859 A1 | 10/2007 | Marshall et al. | |
| 2010/0212385 A1 | 8/2010 | Marshall | |
| 2010/0212390 A1 | 8/2010 | Marshall et al. | |
| 2010/0212394 A1 | 8/2010 | Babbitt et al. | |
| 2010/0213030 A1 | 8/2010 | Green | |
| 2010/0213677 A1 | 8/2010 | Marshall | |
| 2011/0108389 A1 | 5/2011 | Bonnain | |

FOREIGN PATENT DOCUMENTS

| | | |
|---|---|---|
| DE | 40 23 771 | 1/1992 |
| DE | 103 19 302 B3 | 8/2004 |
| EP | 0 384 427 A1 | 8/1990 |
| EP | 1 215 430 A1 | 6/2002 |
| EP | 1 714 939 A1 | 10/2006 |
| GB | 0 235 28 | 0/1910 |
| GB | 1 042 506 | 9/1966 |
| JP | 05-038476 A | 2/1993 |
| JP | 2002-310178 | 10/2002 |
| WO | WO-88/05700 A1 | 8/1988 |
| WO | WO-90/11839 | 10/1990 |
| WO | WO-96/33032 | 10/1996 |
| WO | WO-97/37786 | 10/1997 |
| WO | WO-98/19807 A1 | 5/1998 |
| WO | WO-01/90591 A1 | 10/2002 |
| WO | WO-2006/055185 A1 | 5/2006 |
| WO | WO-2010/099067 A1 | 9/2010 |
| WO | WO-2010/099069 A1 | 9/2010 |
| WO | WO-2010/099081 A1 | 9/2010 |
| WO | WO-2010/099082 A1 | 9/2010 |
| WO | WO-2010/099165 A2 | 9/2010 |
| WO | WO-2010/099171 A1 | 9/2010 |

OTHER PUBLICATIONS

U.S. Appl. No. 11/692,564, filed Mar. 28, 2007, Marshall et al.
U.S. Appl. No. 11/692,584, filed Mar. 28, 2007, Schill et al.
International Search Report for PCT Application No. PCT/US2010/024941 dated Jun. 23, 2010.
International Search Report for PCT Application No. PCT/US2010/024988 dated Jun. 14, 2010.
International Search Report for PCT Application No. PCT/US2010/024992 dated Jun. 2, 2010.
International Search Report for PCT Application No. PCT/US2010/025192 dated Jun. 18, 2010.
Partial Search Report for PCT Application No. PCT/US2010/025182 dated Jul. 14, 2010.
International Search Report for PCT Application No. PCT/US2010/024926 dated May 27, 2010.
American National Can; Drawings showing commercially available 5811-12 necker machine and Parts List; Oct. 1993; 4 pages.
American National Can; Extracts from brochure: 5811/5811-2 Necker Flanger Reformer—Periodic Inspection and Maintenance Procedures; Apr. 22, 1994; 9 pages.
American National Can; Extracts from brochure: ANC Necker Secrets Revealed; 1996; 3 pages.
American National Can; Invoice to Hanil Can Co., Ltd dated Feb. 2, 1998; 1 page.
Notice of Opposition mailed May 12, 2010, to European Application No. 05817255.2; Patent No. 1824622.
PCT International Search Report and the Written Opinion on application No. PCT/US2010/025182 dated Sep. 28, 2010; 17 pages.
USPTO Action on U.S. Appl. No. 12/501,135 mailed Nov. 8, 2011; 16 pages.

* cited by examiner

SELF COMPENSATING SLIDING AIR VALVE MECHANISM

CROSS-REFERENCE TO RELATED APPLICATION

This application is an application claiming the benefit under 35 U.S.C. §119(e) of U.S. Provisional Patent Application No. 61/202,427 filed Feb. 26, 2009, which is incorporated by reference herein in its entirety.

BACKGROUND

The present invention relates generally to the field of pressurized air supplies and passageways for turrets with sliding ram assemblies that are used in can making machinery. More specifically, the present invention relates to a sliding air valve mechanism for use in pressurized air pathway systems for can making machinery.

Conventional can making machinery utilizes sliding ram assemblies to perform a processing operation on a can, such as necking, flanging, curling, or any other suitable processing operation. The sliding ram assemblies are used to guide and control the interaction of the tooling and the can. The can is pressurized with air to strengthen the body and resist the forces of the processing operation.

Traditionally, pressurized air has been supplied directly to the can and sliding ram assemblies via hoses or tubing and fittings. Due to the movement of the sliding ram assemblies, these traditional hoses had to be flexible. These conventional hoses have been subject to damage and wear from rubbing and flexing, thus requiring replacement hoses and additional maintenance work on the machines.

SUMMARY

One exemplary embodiment of the invention relates to a sliding air valve mechanism for an article processing machine with a ram assembly. The sliding air valve mechanism comprises an air inlet passage with a first inlet end and a second inlet end, and an air exit passage with a first exit end proximate the second inlet end and a second exit end proximate to an article processing end of tooling in the ram assembly. The sliding air valve mechanism further comprises a slidable disc positioned between the second inlet end and the first exit end. The slidable disc is configured to slide with movement of the ram assembly such that the slidable disc seals a connection between the second inlet end and the first exit end.

Another exemplary embodiment of the invention provides a turret for an article processing machine assembly. The turret comprises a turret main body, a sliding ram assembly configured to perform a working operation on an article in the article processing machine, and an air manifold device connectable to the turret main body. The air manifold provides pressurized air through a pressurized air pathway system. The pressurized air pathway system includes a turret body air passage extending from the air manifold through the turret body to the sliding ram assembly, and a ram air passage configured to supply pressurized air to an article be processed in the article processing machine at the ram assembly. The ram air passage extends from a first end proximate to the turret body air passage to a second end proximate an article processing end. The pressurized air pathway system further comprises a valve mechanism positioned between one end of the turret body air passage and a first end of the ram air passage.

Yet another exemplary embodiment of the invention provides a machine line. The machine line comprises an article infeed, an article discharge, and a plurality of article processing machine modules. Each machine module includes a transfer star wheel and a turret. The turret comprises a turret main body, a sliding ram assembly configured to perform a working operation on an article in the article processing machine, and an air manifold device connectable to the turret main body. The air manifold provides pressurized air through a pressurized air pathway system. The pressurized air pathway system includes a turret body air passage extending from the air manifold through the turret body to the sliding ram assembly, and a ram air passage configured to supply pressurized air to an article be processed in the article processing machine at the ram assembly. The ram air passage extends from a first end proximate to the turret body air passage to a second end proximate an article processing end. The pressurized air pathway system further comprises a valve mechanism positioned between one end of the turret body air passage and a first end of the ram air passage.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
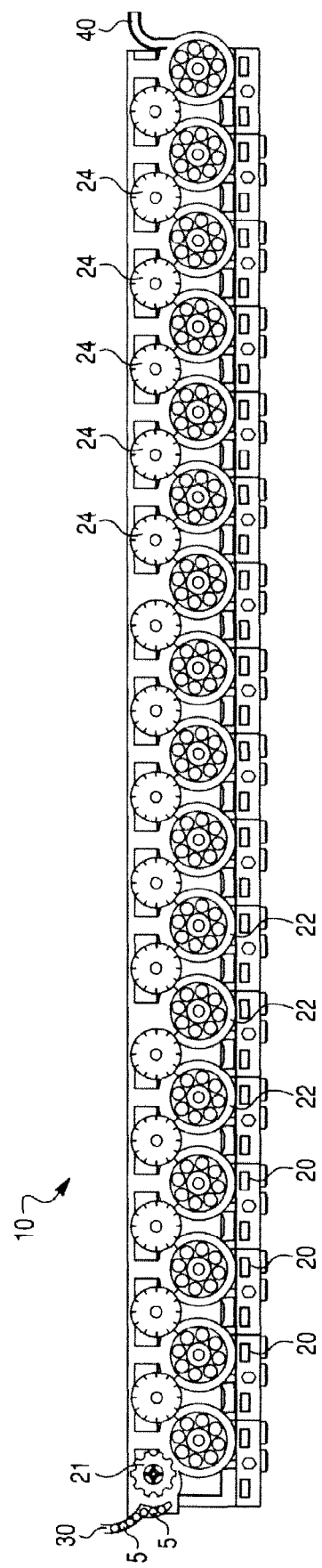
FIG. 1 is a schematic view of a machine line with a plurality of machine modules according to an embodiment.

One aspect of the invention relates to providing an air pathway system for a turret machine with sliding ram assemblies wherein multiple traditional hoses and fittings to supply the pressurized air to the sliding ram assemblies or articles to be worked on by the sliding ram assemblies have been deleted. Accordingly, one embodiment provides an air pathway system in a turret that includes a sliding air valve mechanism linking the turret air path to a sliding ram air path. The sliding air valve mechanism can minimize or prevent any leakage of air in the pressurized air pathway system. The sliding air valve mechanism assists in providing pressurized air to a point of use (e.g., working end of tooling in the sliding ram, or the article to be worked on). The article that is worked on by the tooling is pressurized with air to strengthen the body of the article and to resist the forces of the forming processes (such as necking) in order to hold the can in proper position during the forming processes. The sliding air valve mechanism provides a seal in the air pathway.

Turret machines may be used to form, process or otherwise perform a working action on an article. For example, turret machines may perform necking, flanging, curling, reprofiling, testing, or any other suitable working operation on an article. In a machine line, an article is first fed into a first machine to fill pockets in a turret star wheel. Each star wheel may have any number of pockets to hold articles for processing or transfer. For example, a turret star wheel may have six, eight, ten, or more stations to hold six, eight, ten, or more articles, respectively. The articles are then passed to a transfer star wheel adjacent the turret. Each transfer star wheel has any number of pockets to hold articles for processing or transfer. For example, the transfer star wheel may have ten, twelve, twenty pockets, or any other suitable amount. It will be recognized that the star wheel is capable of having one station up to any suitable number of stations. The transfer star wheel may have the same amount of pockets as the turret star wheels. Alternatively, the transfer star wheels may have more pockets then the turret star wheels.

The article is then passed from the turret star wheel to a transfer star wheel, which transfers the article to another machine in the machine line that will perform another stage of the working operation on the article. When all process/necking stages are complete, the article is discharged from the machine line. The machine line may be a recirculated machine line, a linear line, or any other type of machine line.

For exemplary purposes only, the below description will describe the mechanisms and methods for use on a can. It will be recognized that any other type of article may be used.

Embodiments of the invention relate to mechanisms to use in can making machinery. More specifically, can die necking machines. In the can necking process, the open end of the can is reduced in diameter. In most cases, several reductions are required for the can necking process. Sliding dual ram assemblies are used to guide and control the interaction of the forming tooling and the can. The can is pressurized with air to strengthen the body of the can and resist the forces of necking in order to stabilize and hold the can in the proper position during the forming process.

Embodiments of the invention will now described with reference to the figures.

FIGS. 1-12 illustrate a turret machine 100 for performing a necking operation, or any other suitable operation, on an article 5 through a machine line 10. An article 5 may be a can, any suitable food or beverage container, jar, bottle or any other suitable article.

For exemplary purposes only, the below description will describe the turret machine 100 with sliding disc mechanism 130, which may be used in a machine (such as a necking machine) module 20, or a machine line 10 for use in processing a can 5. It will be recognized that any other type of article 5 (such as that described above) may be used. Alternatively, a sliding disc mechanism 130 and air pathway system 110, 120 may be utilized on a machine that does not operate on cans 5, but may be used in machines that work on any other suitable machine or assembly line 10.

Figure 2:
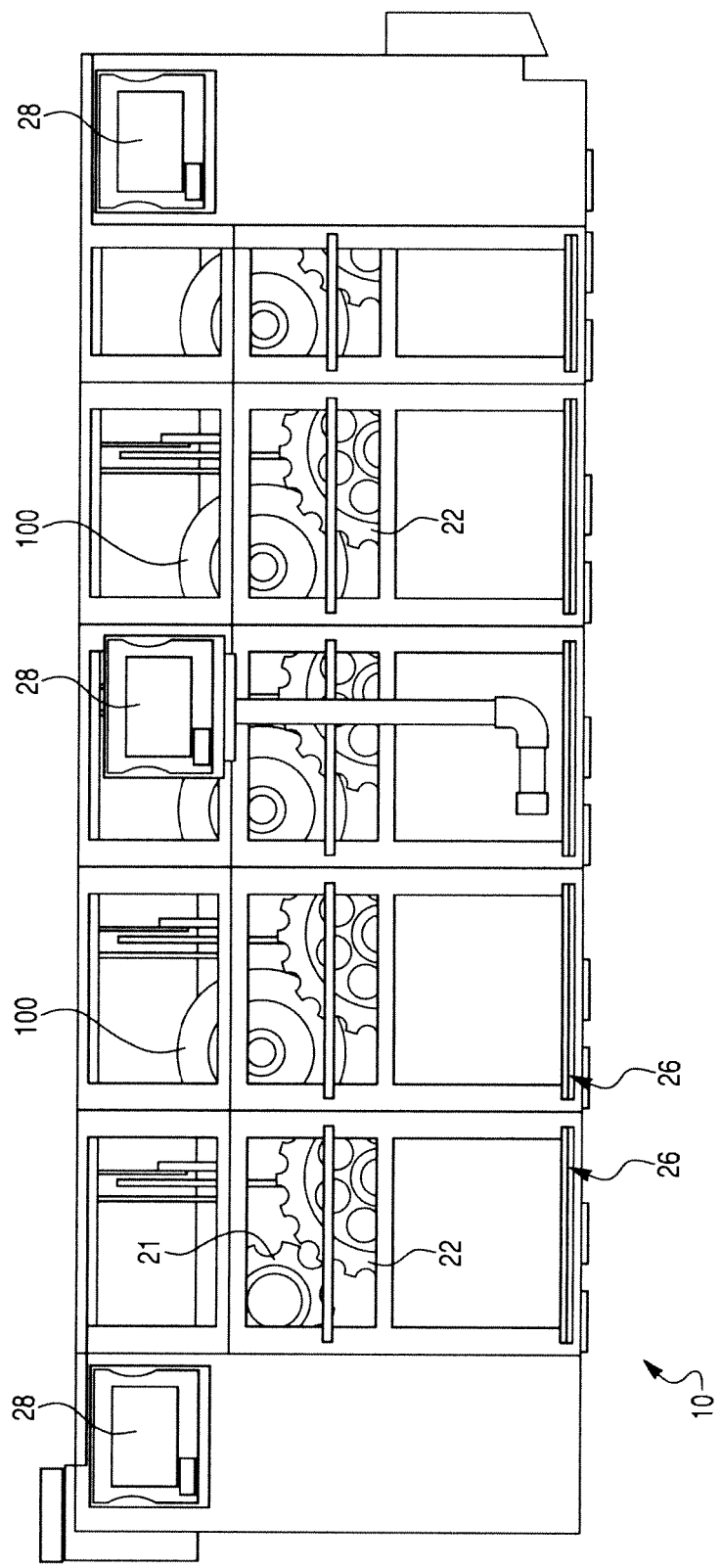
FIG. 2 is a front view of a machine illustrating a plurality of machine modules according to an embodiment.
Figure 3:
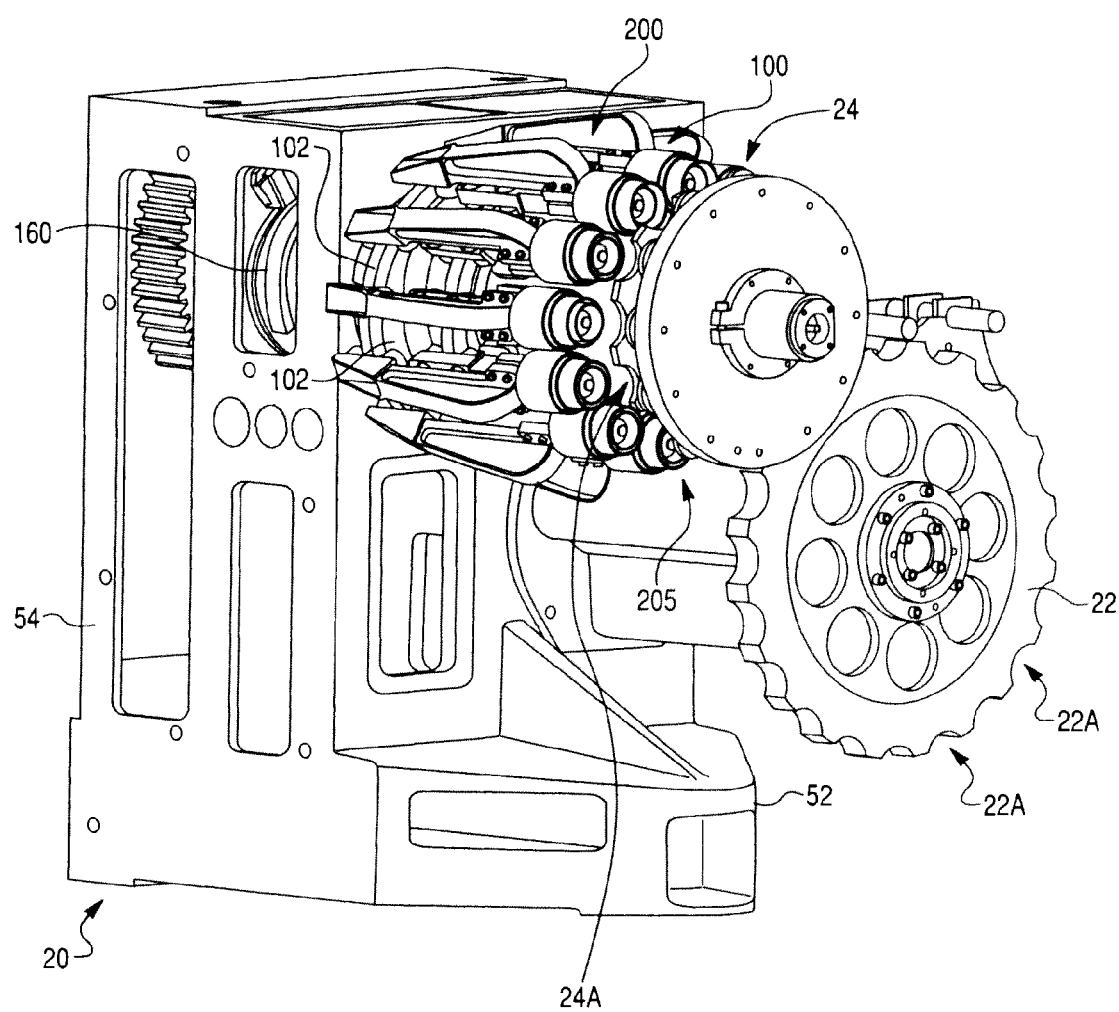
FIG. 3 is a front perspective view of a machine module illustrating a turret and transfer star wheel.

FIGS. 1-2 illustrate a machine line 10 in which cans 5, according to an embodiment, are fed into a continuously rotating infeed transfer star wheel 21 from an infeed 30. The cans 5 are passed from infeed star wheel 21 to pockets 22A in the transfer star wheel 22 in a module 20 of the machine line, best shown in FIG. 2. The cans 5 are continuously rotated throughout the machine line 10 as the cans 5 pass from one module 20 to the next module 20. From the transfer star wheel 22, the cans 5 are passed to pockets 24A in a turret star wheel 24 on a turret 100 (FIG. 3). In the pockets 24A of the turret star wheel 24, the can 5 undergoes a working operation (necking operation) by the tooling 205 (FIG. 5) on the appropriate dual ram assembly 200 that corresponds to the pocket 24A on the turret star wheel 24. After completion of the necking operation in a first stage on the first module 20, the can 5 is passed to an adjoining transfer star wheel 22 and the process is repeated throughout the machine line 10. At the end of the machine line 10, the can 5 may exit the machine line 5 via a discharge (or exit) track 40. As can be seen in FIG. 2, the machine line 10 may include workstations 28 for an operator to adjust and/or operate the control of the machine line 10. The modules 20 may also include guards or covers 26 that enclose each module 20.

While the invention is not so limited, embodiments of the invention may comprise forming/necking machines 100, with one or more dual ram assemblies 200, constructed as modules 20. The use of modules 20 allows for the machine line 10 to be assembled and changed to provide as many forming stages as is required and to allow for adding additional stages such as flanging, necking, trimming, curling, threading, and/or base reforming/reprofiling stages, which may added and/or removed as desired.

Figure 4:
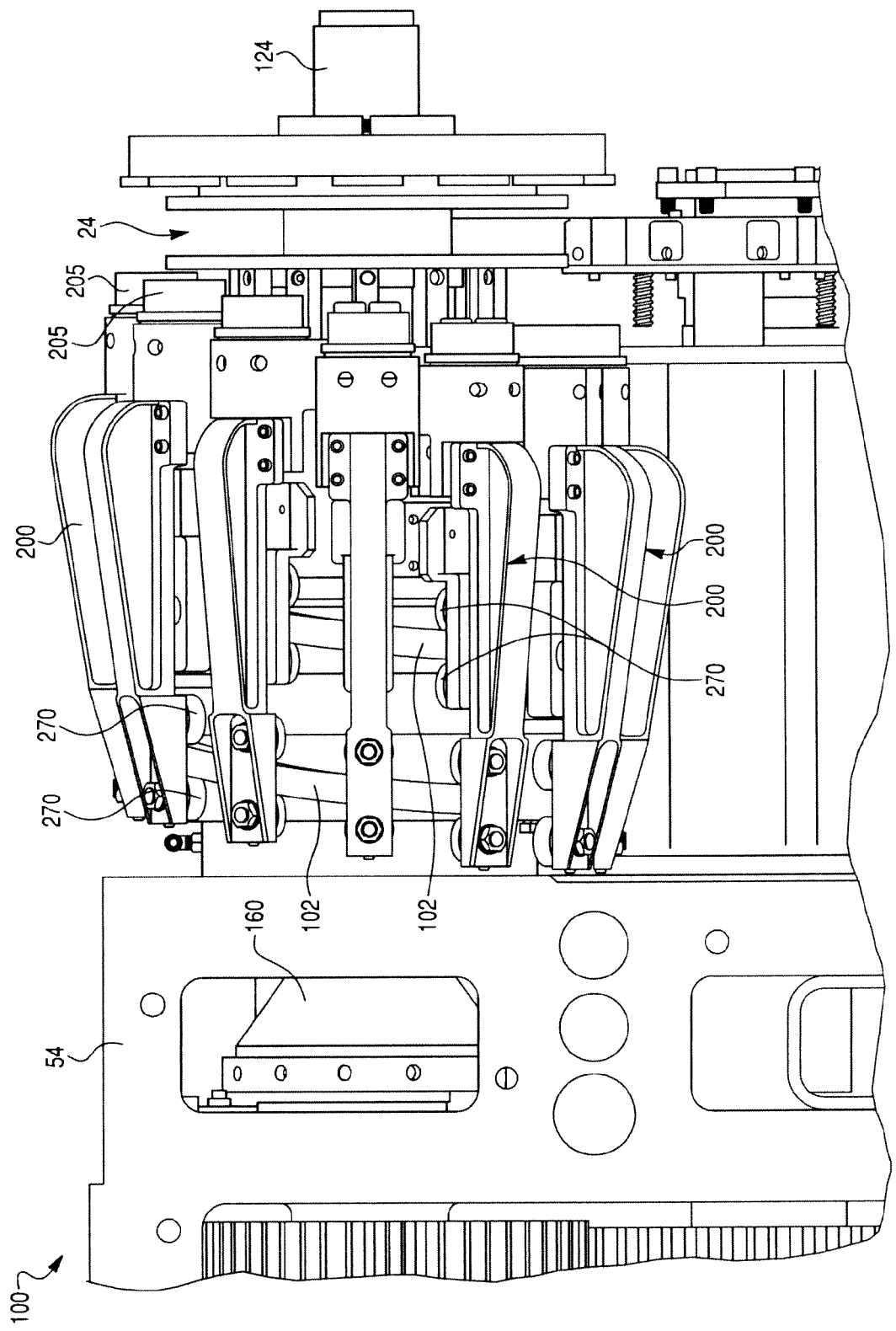
FIG. 4 is a detail side view of the turret of FIG. 3.
Figure 9:
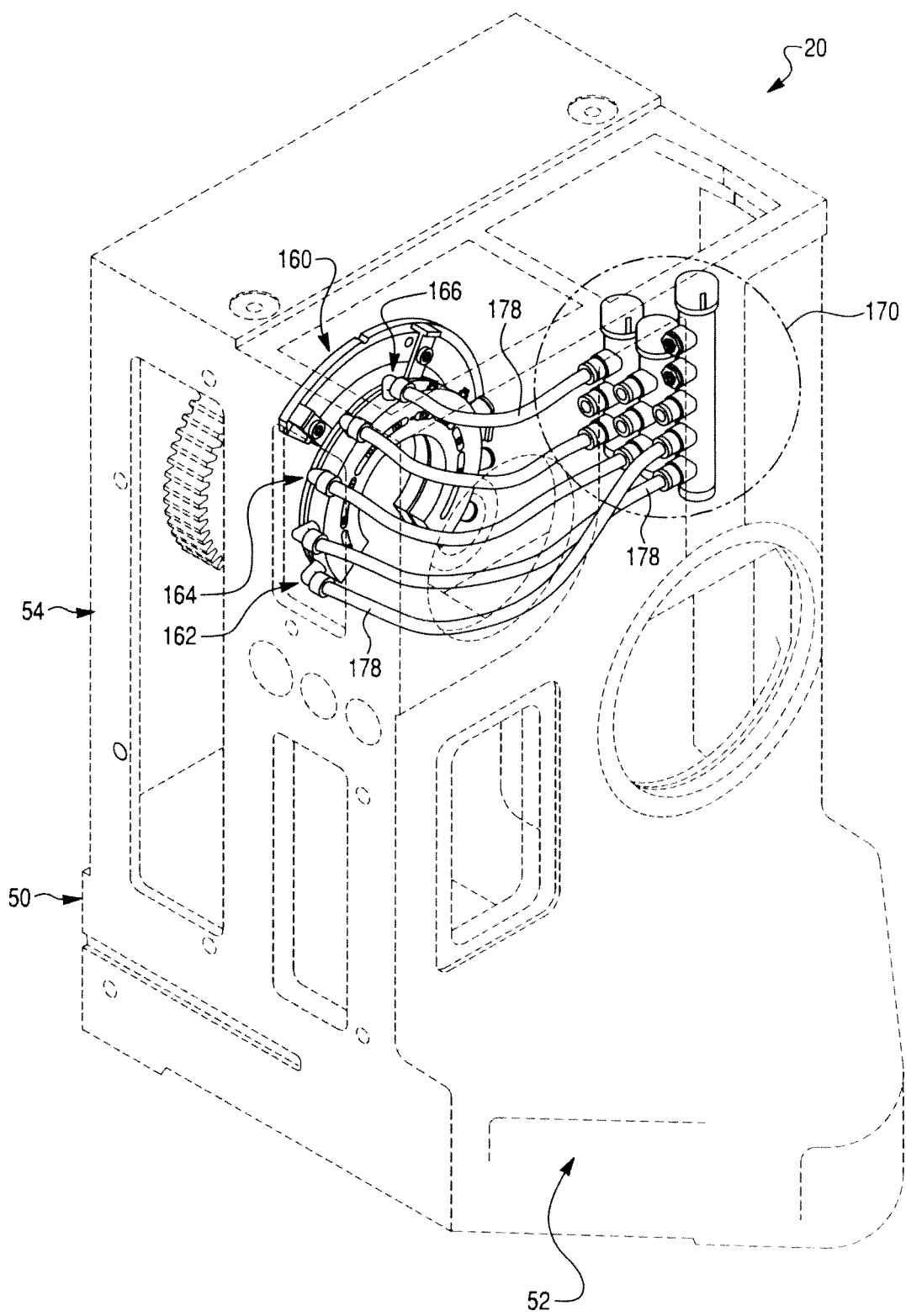
FIG. 9 is a perspective view of a machine module base, in which an air manifold and an air supply mechanism are shown.
Figure 10:
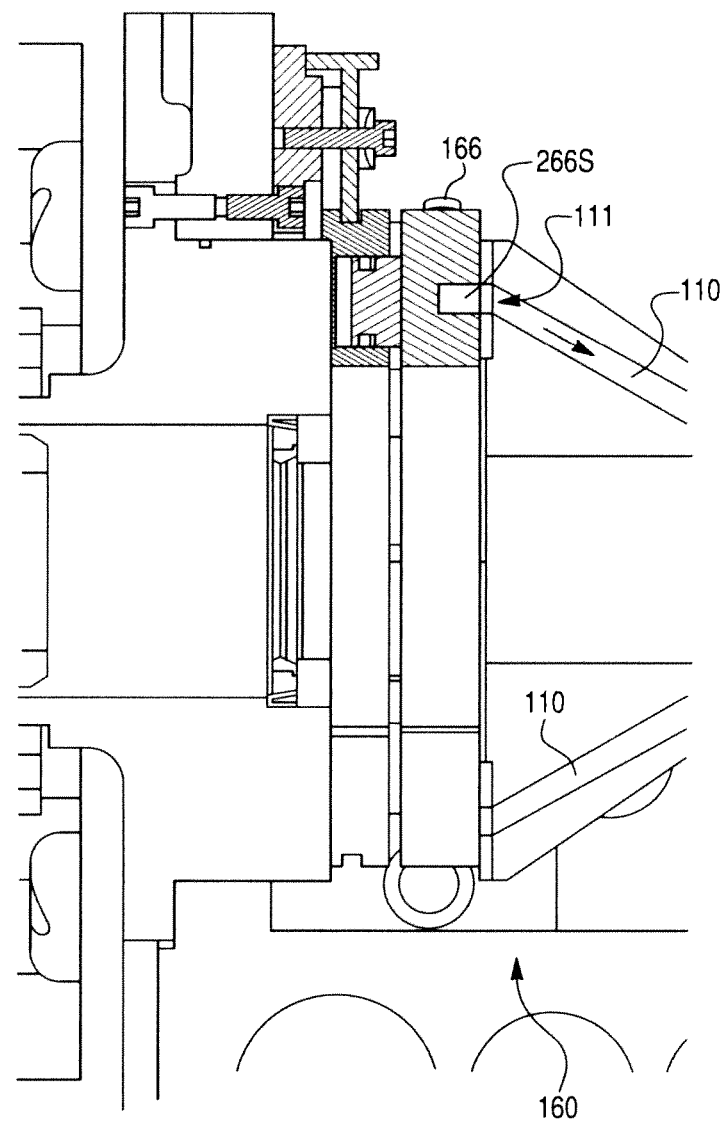
FIG. 10 is a detail cross-sectional view of the air manifold of FIG. 9.

As best seen in FIGS. 3, 4, and 9 the module 20 includes a base 50 with a foot portion 52 and a leg portion 54. The turret machine 100 is positioned on the base 50. The module 20 also includes a corresponding transfer star wheel 22. The dual ram assemblies 200 are positioned around the circumferential surface of the turret 100.

Figure 5:
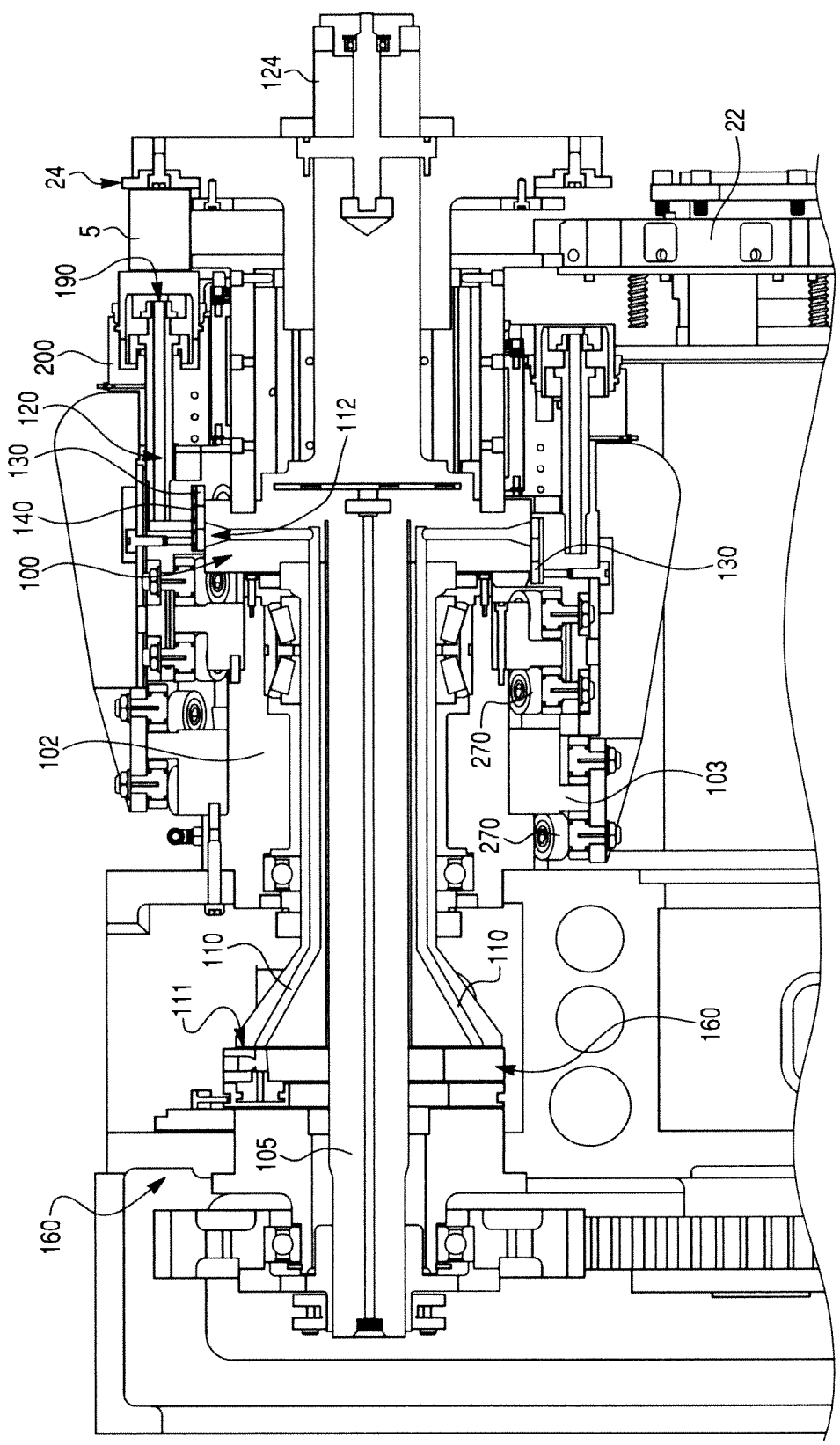
FIG. 5 is a cross-sectional view of the turret taken along line V-V in FIG. 4.
Figure 7A:
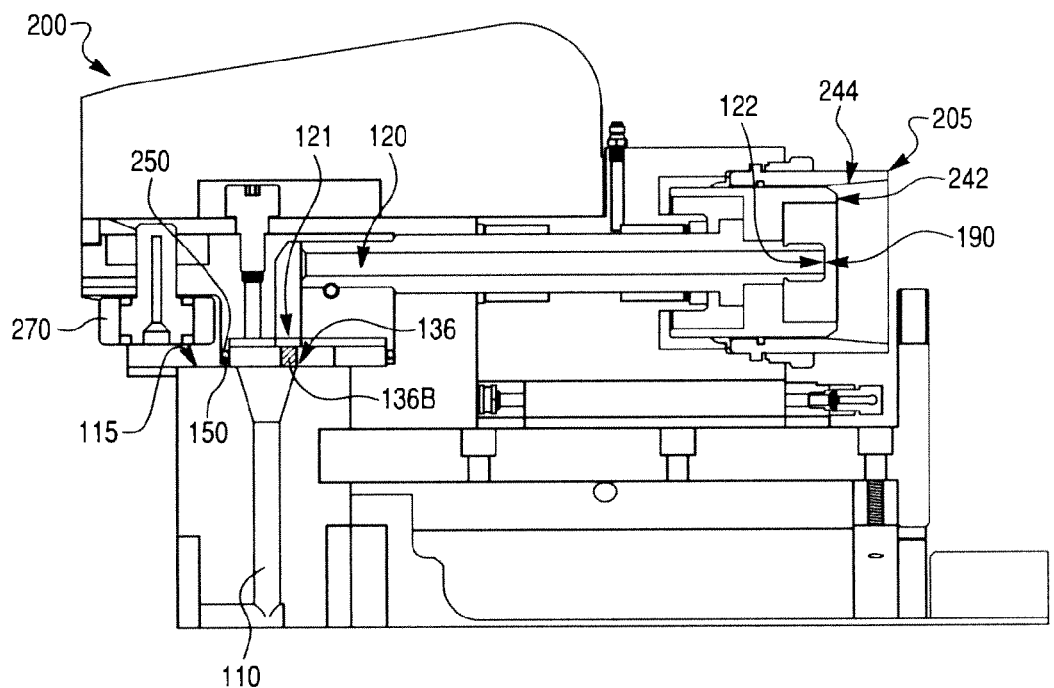
FIG. 7A is a detail sectional view of a sliding ram assembly illustrating the sliding valve mechanism.

Each dual ram assembly 200, as shown in FIGS. 3-5, includes cam followers 270 that are configured to follow the path or surface of cams 103 positioned on a bearing 102 of the turret 100. Each ram assembly 200 includes tooling 205 to perform a necking or other working operation on the can 5. The tooling 205, for example, includes an inner knockout tool 242 and an outer die tool 244, such as shown in FIG. 7A. An open end of the can 5 is positioned in the pocket 24A so that the inner knockout tool 242 moves to be inserted into the can 5 while the outer die 244 is moved to surrounds an exterior surface of a sidewall of the can 5 to perform the necking or other working operation. FIG. 5 illustrates a can 5 positioned in a turret star wheel pocket 24A adjacent tooling 205 prior to the tooling 205 beginning the necking operation on the can 5.

As the cam followers 270 follow their respective cam surfaces 102, the tooling 205 slides toward or away from a can 5 to be worked on in a corresponding pocket 24A in the turret star wheel 24. When the inner and outer tooling 242, 244 of the tooling 205 reach the can 5, the tooling 242, 244 performs a necking operation on the can 5, and then withdraws as the cam followers 270 continue following the path of their respective cam surface 103.

Figure 6:
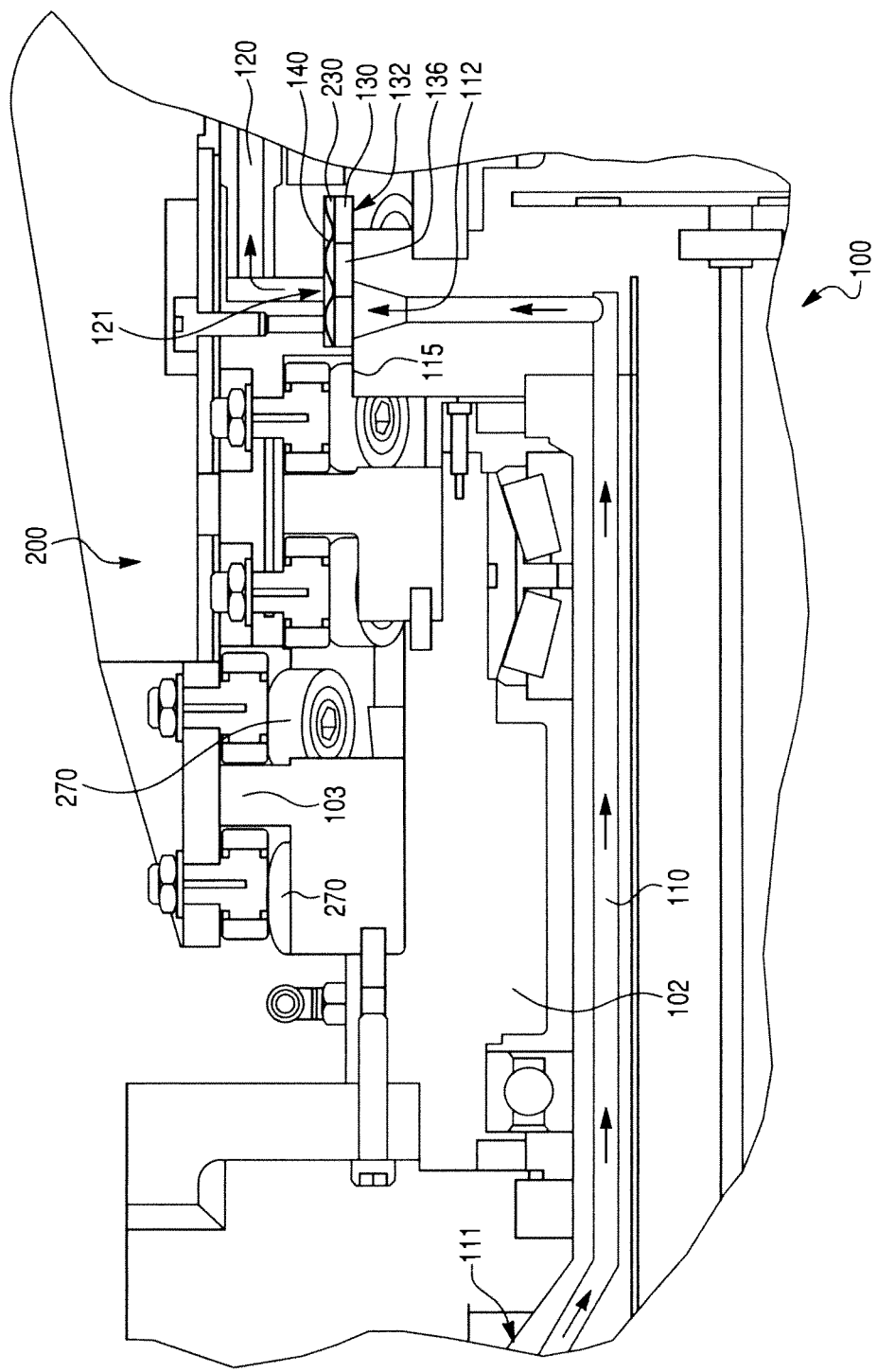
FIG. 6 is a detail cross-sectional view of the turret of FIG. 5 illustrating an air inlet path, air exit path, and sliding valve mechanism.
Figure 8:
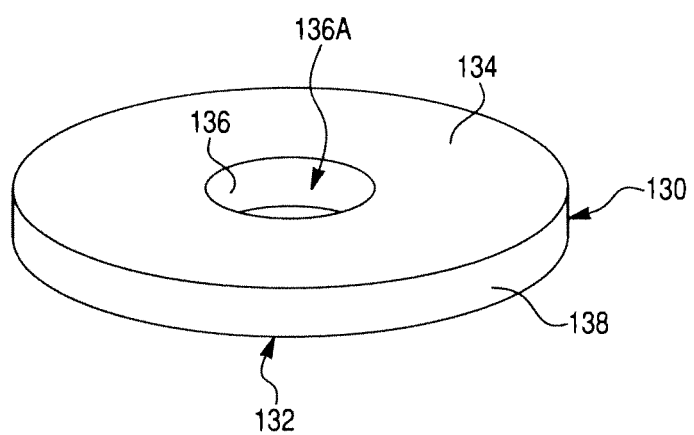
FIG. 8 is a perspective view of the sliding valve mechanism.

An air valve mechanism and air pathway system, according to an embodiment, are best shown in FIGS. 5-6 and 8. The turret 100 includes a turret shaft 105 and a bearing 102 surrounding a portion of the shaft 105. The sliding ram assemblies 200 (via cam followers 270) follow the surface of the cams 103 on the turret 100, thus moving the tooling 205 toward and away from a can 5 in the corresponding turret star wheel 24 pocket 24A. The sliding ram assemblies 200 are used to guide and control the interaction of the tooling 205 and the can 5. The can 5 is pressurized at a point of use 190 (at a can processing or working end of the tooling 205) with air to strengthen the can body and resist the forces of the processing operation and, thus, minimize any unwanted movement of the can 5 during the working (necking) operation.

The pressurized air is provided to the can 5 via an air passage system 110, 120, a valve mechanism 130, and an air manifold 160. The pressurized air is supplied from the air manifold 160 on the turret 100 to a turret air inlet passage 110 positioned in a stationary component of the turret 100. The turret air inlet passage 110 includes a first inlet end 111 adjacent the air manifold 160. The turret air inlet passage 110 also includes a second inlet end 112 adjacent a slidable disc 130 (sometimes referred to as a valve mechanism) positioned in a cavity (sometimes referred to as a pocket or notch) 230 in the ram assembly 200.

The corresponding ram assembly 200 includes a ram air exit passage 120 that includes a ram first exit end 121 and a ram second exit end 122. The ram first exit end 121 is adjacent the slidable disc 130. The ram second exit end 122 is adjacent a point of use 190 at an end of the tooling 205 at a can processing/working end. The ram air exit passage 120 moves (relative to the stationary component of the turret 100 and, thus, the turret air inlet path 110) via the rotational and sliding movement of the ram assembly 200. As the ram assembly 200 slides toward and away from the can 5 in a corresponding turret star wheel 24 pocket 24A, the ram air exit passage 120 moves so that the opening area 120A of the passage 120 at the first exit end 121 moves to be fully aligned or less aligned with the opening provided by the turret second inlet end 112. The slidable disc 130 slides with the movement of the ram assembly 200. The slidable disc 130 provides a seal linking the air inlet (stationary) path and the air exit (movable) path 120.

As best seen in FIG. 8, the slidable disc 130 includes a flat inlet or turret side surface 132, an opposite exit or ram side surface 134, and a circumferential side surface 138. The turret side surface 132 is positioned adjacent a flat surface 115 of a stationary component of the turret 100. The flat surface 115 is part of a stationary component of the turret 100. Portions of the turret 100 may rotate, but the flat surface 115 is completely stationary. The ram side surface 132 is positioned adjacent a portion of the ram assembly 200. The slidable disc 130 is positioned in the cavity 230 in the ram assembly 200 so that the slidable disc 130 will slide with the ram assembly 200 as it moves.

The slidable disc 130 includes an opening 136 in a central portion of the disc 130 that extends from the ram side surface 134 to the turret side surface 132. Pressurized air from the turret air inlet passage 110 passes through the opening 136 and into the ram air exit passage 120. The opening 136 has a cross-sectional opening area represented by 136A. The operable opening area size 136B (See FIG. 7A) of the slidable disc 130 varies with movement of the ram assembly 200. That is, the operable opening area size 136B corresponds to the area of the opening 136 that is not covered or blocked by a portion of the turret 100 or ram assembly 200 as the slidable disc 130 moves; it is the area 136B through which the pressurized air may actually pass at any given moment. A minimum area of the operable opening area 136B is equal to or greater than a cross-sectional area 120A (FIG. 7B) of the ram air exit passage.

The slidable disc 130 comprises a material that has a low coefficient of friction, or any other suitable material. For example, the slidable disc 130 may comprise graphite or a plastic composite, or any other suitable material. Although the slidable disc 130 is shown having a generally circular shape, the slidable disc 130 may comprise any suitable shape, size, or configuration.

The supplied pressurized air passes from the turret air inlet passage 110, through the slidable disc opening 136, through the ram air exit passage 120 and to the point of use 190. When the desired (predetermined) air pressure is achieved at the point of use 190, an internal pressure is applied to the ram side surface 134 of the slidable disc 130, thus forcing the slidable disc 130 against the flat surface 115 of the turret 100 to create a seal. As the air pressure is increased, due to continued supply of the pressurized air, the force creating the seal is also increased. This provides a self compensating valve seal dependant upon the air pressure. The ratio of air pressure to force of the seal may be adjusted by varying the size of the slidable disc 130 and air passages 110, 120.

In the embodiment shown in FIGS. 5 and 6, the air pathway system further includes a spring 140 positioned in the cavity 230 in the ram assembly 200. The spring 140 may be a wave spring, or any other suitable type of spring. The spring 140 is positioned against a ram side surface 134 of the slidable disc 130. The spring 140 is provided in order to further create and enforce the seal between the slidable disc 130 and the flat surface 115 of the turret 100, in order to prevent leakage of the pressurized air in the connection between the turret 100 and ram assembly 200. The wave spring 140 pushes the slidable disc 130 downwards and against the flat surface 115 of the turret.

Figure 7B:
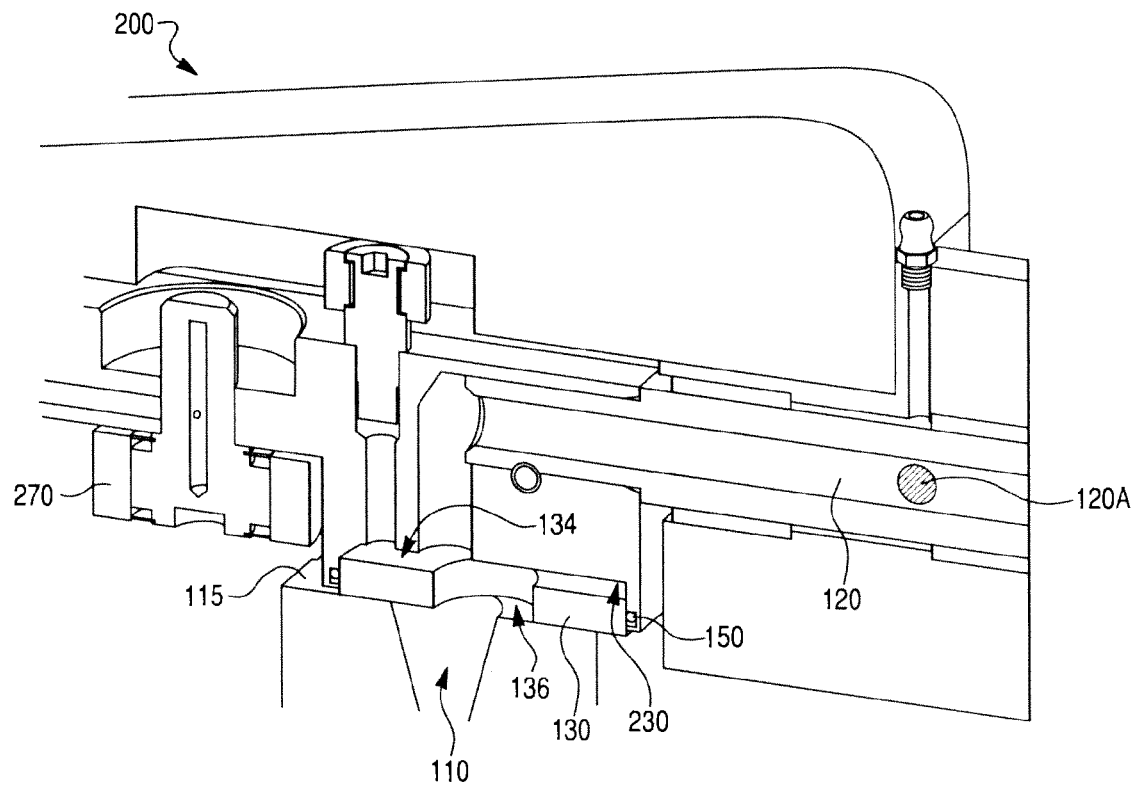
FIG. 7B is a perspective detail view of the sliding ram assembly of FIG. 7A, in which an o-ring is shown.

In the embodiment shown in FIGS. 7A and 7B, the air pathway system includes an o-ring 150. The o-ring 150 is positioned in a groove (sometimes referred to as a cavity, pocket, or notch) 250 in the ram assembly 200. The o-ring 150 is positioned around the circumferential side surface 138 of the slidable disc 130. The o-ring provides a further seal to seal the connection of the slidable disc 130 between the ram assembly 200 and the stationary turret surface 115.

Although not shown, it will be recognized that the o-ring 150 may be used in conjunction with the wave spring 140 shown in FIGS. 5-6, and in any other suitable embodiment.

FIGS. 9-12 illustrate an air manifold assembly for use on a machine module 20. The air manifold assembly includes an air manifold 160 that supplies varying levels of air pressure to the air passage system for use with the slidable disc 130. FIG. 9 illustrates the base 50 of a module, without the turret 100. The air manifold 160 supplies pressurized air to the turret air inlet passage 110 at the first air inlet end 111.

The air manifold 160 includes a plurality of ports that are configured to provide varying levels of pressurized air. The ports 162, 164, 166 correspond to different stations or locations around the circumference of the turret 100 that the ram assemblies 200 may be positioned. For example, the air manifold includes low pressure ports 162, medium pressure ports 164, and high pressure ports 166. Each port 162, 164, 166 is connected to a corresponding turret air inlet passage 110. The port configuration may vary to meet specific process or container requirements. Thus, each turret 100 will have at least one low port 162 and one corresponding "low" air inlet passage 110; at least one medium port 164 and one corresponding "medium" air inlet passage 110; and at least one high port 166 providing high pressurized air to a corresponding "high" air inlet passage 110. FIG. 5 illustrates just a "high" air inlet passage 110 at a top portion of the air manifold, as well as a "low" air inlet passage 110 at a bottom portion of the air manifold. The turret 100 may include additional air inlet passages 110 that are not shown in this cross-sectional view.

The varying levels of pressurized air are provided so that the ram assemblies 200 and corresponding points of use 190 receive the appropriate amount of pressurized air depending upon their location on the turret (and, thus, the position of the corresponding tooling 205 in the necking process). As can be seen in FIG. 9, the ram assemblies 200 at the top most portion (top dead center) of the turret 100 receive the greatest amount of air pressure from the high pressure ports 166 and corresponding air passages 110, 120. The ram assemblies 200 at the lower portions of the turret 100 receive the lowest amount of air pressure from the low pressure ports 162 and corresponding air passages 110, 120. At the top most portion of the turret 100, the tooling 205 of the ram assemblies 200 would be at their most fully extended position as the ram assemblies 200 slide along the cams 103 by the cam followers 270. At the lower portions of the turret 100, the tooling 205 would either be fully retracted (thus, not contact or working on the can 5) or would be mostly retracted; which would require a lesser amount of air pressure to stabilize the corresponding can 5.

As the ram assemblies 200 follow the surface of the cams 103 and rotate with the surface of the turret 100 via a bearing assembly 102, the air manifold 160 remains fixed. As turret 100 rotates, air is transferred from the air manifold 160 to air passages 110 via contact surface (first inlet end) 111. Thus, as the ram assemblies 200 rotate with the turret 100, the pressurized air from air manifold 160 exits passages 120. Pressurized air from each port 162, 164, 166 passes into the corresponding turret air inlet passage 110 via a corresponding slot 262S, 264S, 266S in the stationary air manifold 160 (See FIGS. 10 and 11). Air passes through the port 162, 164, 166 and out the exit opening 262, 264, 266 and into the corresponding slot 262S, 264S, 266S. The slots 262S, 264S, 266S fill with the pressurized air. The air inlet passage 110 rotates with the rotating turret 100, and when the air inlet passage 110 aligns with a slot 262S, 264S, 266S in the stationary air manifold 160, the pressurized air passes into the air inlet passage 110 via the first air inlet end 111.

Figure 12:
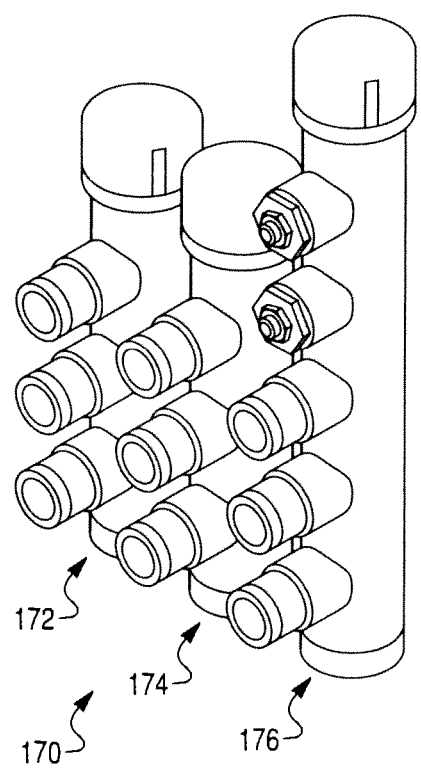
FIG. 12 is a perspective view of the air supply mechanism of FIG. 9.

The air manifold 160 receives its air supply from an air supply mechanism 170 in the module 20. Hoses 178 connect the air supply mechanism 170 to the air manifold 160 and its respective ports 162, 164, and 166. FIG. 12 illustrates the air supply mechanism 170, which includes a high pressurized air supply 172, a medium pressurized air supply 174, and a low pressurized air supply 176. The ranges of the air pressurization may vary as appropriate according to the specific working conditions and requirements of each module 20. As can be seen in the FIGURES, the only tubing or hoses used, according to embodiments of the invention, are the hoses 178 in the stationary air manifold 160. Tubing or hoses are not used in the movable ram assemblies 200 for supply pressurized air or to connect to the movable ram assemblies 200.

Figure 11:
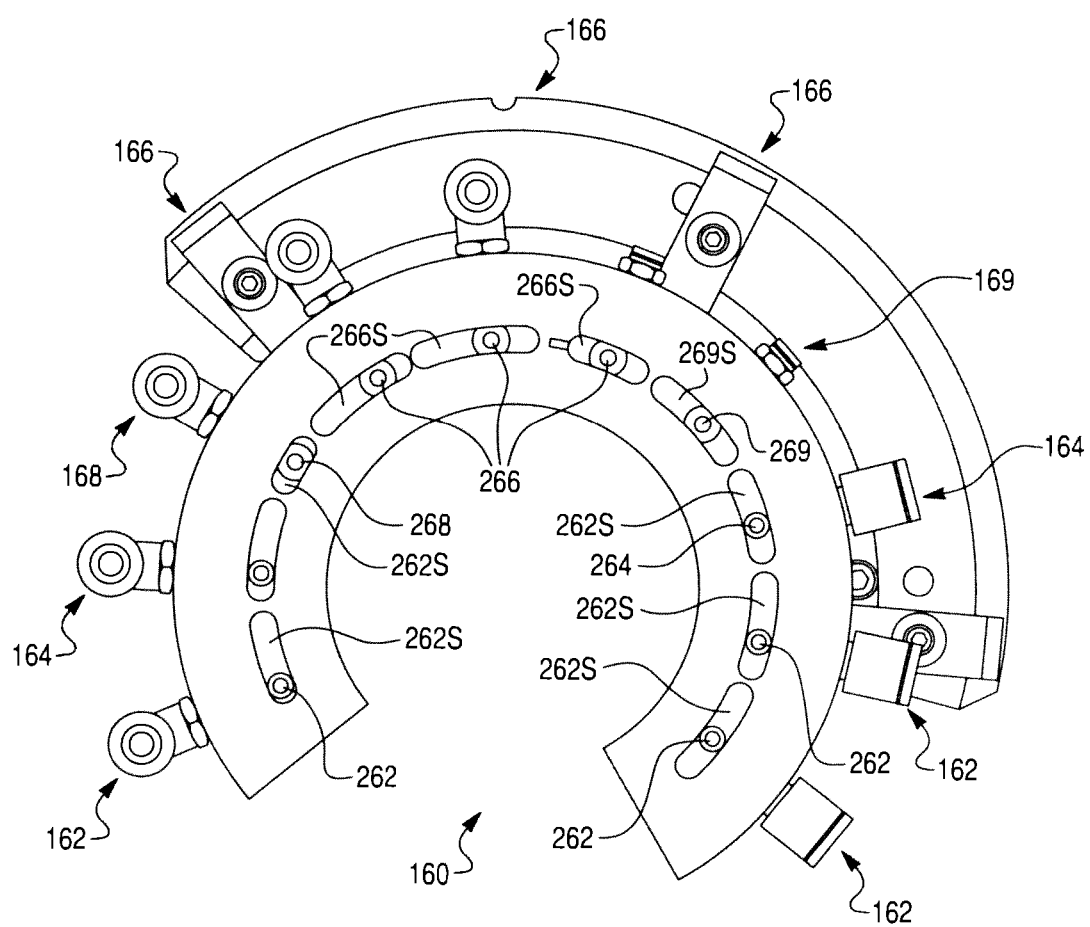
FIG. 11 is a front detail view of the air manifold of FIG. 9.

As can be seen in FIG. 11, the air manifold 160 can include additional pressurized air ports. For example, the air manifold 160 can additionally include a high/medium port 168 and a hi-bleed port 169. The purpose of these ports 168, 169 is for air conservation. The air pressure in the necking process is varied, and some of the high pressurized air is reused through the hi-bleed port 169. The air manifold 160 and air supply mechanism 170 may include any other varying levels of pressurized air in addition to or in substitution for the low, medium, and high pressurized air supply.

It is important to note that the construction and arrangement of the sliding air valve mechanism as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Furthermore, it will be recognized that the terms attached, connected or fixed can mean either removably or permanently attached, connected or fixed. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A sliding air valve mechanism for an article processing machine with a ram assembly, comprising:
    an air inlet passage with a first inlet end and a second inlet end;
    an air exit passage with a first exit end proximate the second inlet end, and a second exit end proximate to an article processing end of tooling in the ram assembly; and
    a slidable valve component positioned between the second inlet end and the first exit end, the valve component including an inlet side and an opposing exit side, the valve component further including an opening passing through the valve component from the inlet side to the exit side, the second inlet end being disposed at the inlet side and the first exit end being disposed at the exit side, the valve component configured to slide with movement of the ram assembly, the opening being movable with the sliding of the valve opening into an alignment that connects the second inlet end and the first exit end via the opening.

2. The valve mechanism of claim 1, wherein the air exit passage is positioned in the movable ram assembly and moves relative to the air inlet passage with the movable ram assembly.

3. The valve mechanism of claim 2, wherein air pressure in the air exit passage acts against the exit side of the valve component to seal the valve component against a flat surface around a periphery of the second inlet end to prevent air from leaking between the valve component and the flat surface.

4. The valve mechanism of claim 1, wherein an operable opening size of the opening in the valve component varies with movement of the ram assembly, and a minimum area of the operable opening is equal to or greater than a cross-sectional area of the air exit passage.

5. The valve mechanism of claim 1, further comprising a spring that acts additionally against the exit side of the valve component to seal the valve component against the flat surface around the periphery of the second inlet end to prevent air from leaking between the valve component and the flat surface.

6. The valve mechanism of claim 1, wherein the valve component is a slidable disc.

7. The valve mechanism of claim 6, further comprising an o-ring positioned around a circumferential surface of the slidable disc.

* * * * *